US011290480B2

(12) United States Patent
Denning et al.

(10) Patent No.: US 11,290,480 B2
(45) Date of Patent: Mar. 29, 2022

(54) NETWORK VULNERABILITY ASSESSMENT TOOL

(71) Applicant: Bank of America Corporation, Charlotte, NC (US)

(72) Inventors: John Henry Denning, Charlotte, NC (US); Alexander Thomas Edwards, Charlotte, NC (US); Ruchira Ghosh, Southlake, TX (US)

(73) Assignee: Bank of America Corporation, Charlotte, NC (US)

( * ) Notice: Subject to any disclaimer, the term of this patent is extended or adjusted under 35 U.S.C. 154(b) by 165 days.

(21) Appl. No.: 16/883,443

(22) Filed: May 26, 2020

(65) Prior Publication Data

US 2021/0377292 A1 Dec. 2, 2021

(51) Int. Cl.
*H04L 29/06* (2006.01)

(52) U.S. Cl.
CPC ............................... *H04L 63/1433* (2013.01)

(58) Field of Classification Search
CPC .................................................. H04L 63/1433
See application file for complete search history.

(56) References Cited

U.S. PATENT DOCUMENTS

| | | |
|---|---|---|
| 7,418,733 B2 | 8/2008 | Connary et al. |
| 7,509,681 B2 | 3/2009 | Flowers et al. |
| 7,526,806 B2 | 4/2009 | Wiley et al. |
| 7,593,859 B1 | 9/2009 | Owens et al. |
| 7,673,043 B2 | 3/2010 | Keir et al. |
| 7,761,918 B2 | 7/2010 | Gula et al. |
| 7,805,362 B1 | 9/2010 | Merrell et al. |
| 7,845,007 B1 | 11/2010 | Kennis |
| 7,870,078 B2 | 1/2011 | Clark et al. |
| 7,954,159 B2 | 5/2011 | Hrabik et al. |
| 8,170,020 B2 | 5/2012 | Oliver et al. |
| 8,260,654 B2 | 9/2012 | Owens et al. |
| 8,352,281 B2 | 1/2013 | Clark et al. |
| 8,429,751 B2 | 4/2013 | Mizrahi et al. |
| 8,458,798 B2 | 6/2013 | Williams et al. |
| 8,572,750 B2 | 10/2013 | Patel et al. |
| 8,615,582 B2 | 12/2013 | McClure et al. |
| 8,661,126 B2 | 2/2014 | Cole et al. |
| 8,806,632 B2 | 8/2014 | Stefanidakis et al. |
| 8,813,025 B1 | 8/2014 | Hammet et al. |
| 9,749,358 B2 | 8/2017 | Bailey et al. |
| 9,842,336 B2 | 12/2017 | Liu et al. |
| 9,900,312 B2 | 2/2018 | Mansour et al. |
| 9,954,881 B1 | 4/2018 | Lin et al. |

(Continued)

FOREIGN PATENT DOCUMENTS

WO WO-2012110501 A1 * 8/2012 ........... G06F 21/566

*Primary Examiner* — Sarah Su (57) ABSTRACT

A system includes a plurality of servers hosting a plurality of software applications, a data lake, and a vulnerability assessment tool. The data lake is configured to store data related to vulnerabilities in the servers and applications. The data lake also stores data on the number of intrusion events detected on each application. The vulnerability assessment tool is configured to generate logic tables relating the data on server vulnerabilities, application vulnerabilities, and application intrusion counts. The vulnerability assessment tool may use the extrapolations from the newly ordered data to flag applications or servers for prioritized security improvements.

20 Claims, 4 Drawing Sheets

(56) References Cited

U.S. PATENT DOCUMENTS

| | | |
|---|---|---|
| 9,959,574 B2 | 5/2018 | Edvardson |
| 9,967,278 B2 | 5/2018 | Jevans et al. |
| 9,977,904 B2 | 5/2018 | Khan et al. |
| 10,097,576 B2 | 10/2018 | Evans et al. |
| 10,104,102 B1 | 10/2018 | Neumann |
| 10,140,616 B2 | 11/2018 | Liu et al. |
| 10,148,683 B1 | 12/2018 | Lin et al. |
| 10,181,032 B1 | 1/2019 | Sadaghiani et al. |
| 10,275,601 B2 * | 4/2019 | Smith .................. G06F 21/577 |
| 10,284,574 B1 | 5/2019 | Aziz et al. |
| 10,454,963 B1 * | 10/2019 | Smith ................. H04L 63/1425 |
| 10,482,395 B2 | 11/2019 | Sadaghiani et al. |
| 10,503,910 B2 | 12/2019 | Johns |
| 2003/0233581 A1 | 12/2003 | Reshef et al. |
| 2009/0055931 A1 | 2/2009 | Kim et al. |
| 2010/0125663 A1 | 5/2010 | Donovan et al. |
| 2010/0235917 A1 | 9/2010 | Ku et al. |
| 2010/0262688 A1 | 10/2010 | Hussain et al. |
| 2014/0082736 A1 * | 3/2014 | Guarnieri ........... H04L 63/1433 726/25 |
| 2014/0298469 A1 | 10/2014 | Marion et al. |
| 2014/0373150 A1 | 12/2014 | Song et al. |
| 2016/0337400 A1 | 11/2016 | Gupta |
| 2017/0208093 A1 | 7/2017 | Williams et al. |
| 2017/0346824 A1 * | 11/2017 | Mahabir ............. H04W 12/088 |
| 2018/0033089 A1 | 2/2018 | Goldman et al. |
| 2018/0288032 A1 | 10/2018 | Boxiner et al. |
| 2019/0114436 A1 * | 4/2019 | Kim ................... G06F 11/3684 |

* cited by examiner

| 300 | | A1 | A2 | A3 | A4 | | | |
|---|---|---|---|---|---|---|---|---|
| 302 | ATO | 15 | 4 | 9 | 7 | | | |

304

| 306 | APP COPY VULNERABLITIES | 12 | 9 | 7 | 14 | 7 | 6 | 3 | 2 |
|---|---|---|---|---|---|---|---|---|---|
| 308 | SERVER VULNERABLITIES | S1: 24 | | S2: 6 | | S3: 2 | | S4: 10 | |
| 310 | TOTAL VULNERABILITY COUNT | 36 | 33 | 13 | 20 | 9 | 8 | 13 | 12 |

312

| 314 | EXPLOITATION RATIO | 0.417 | 1.153 | 0.121 | 0.444 | 0.450 | 0.692 | 0.875 | 0.583 |
|---|---|---|---|---|---|---|---|---|---|
| | | A1 | | A2 | | A3 | | A4 | |

FIG. 4

| 400 | | S1 | S2 | S3 | S4 | | | |
|---|---|---|---|---|---|---|---|---|
| 402 | SERVER VULNERABLITIES | 24 | 6 | 2 | 10 | | | |

404

| 406 | APP COPY VULNERABLITIES | A1: 12 | A1: 7 | A2: 9 | A2: 7 | A3: 14 | A3: 3 | A4: 6 | A4: 2 |
|---|---|---|---|---|---|---|---|---|---|
| 410 | TOTAL VULNERABILITY COUNT | 45 | | 27 | | 15 | | 15 | |
| 408 | ATO | A1: 15 | | A2: 4 | | A3: 9 | | A4: 7 | |

412

| 414 | TOTAL INTRUSION COUNT | 19 | 24 | 11 | 16 |
|---|---|---|---|---|---|
| 416 | VULNERABILITY RATIO | S1: 2.368 | S2: 1.125 | S3: 1.364 | S4: 0.938 |

138

| CRITICALITY | APP | SERVER |
|---|---|---|
| 1 | A1 → S2 | S4 → A3 |
| 2 | A4 → S3 | S4 → A4 |
| 3 | A3 → S4 | S2 → A3 |
| 4 | A4 → S4 | S2 → A1 |
| 5 | A3 → S2 | S3 → A2 |
| 6 | A2 → S3 | S3 → A4 |
| 7 | A1 → S1 | S1 → A1 |
| 8 | A2 → S1 | S1 → A2 |

*FIG. 5*

NETWORK VULNERABILITY ASSESSMENT TOOL

TECHNICAL FIELD

This disclosure relates generally to information security and software development and management. More specifically, this disclosure relates to a network vulnerability assessment tool.

BACKGROUND

Many enterprises have expansive networks that include a large number of network devices. For example, an enterprise may use several different servers to host copies of a single application. Additionally, each server may host copies of a variety of applications. Control and maintenance of these servers may be performed by various parties. Such network environments allow data to be shared among the different network devices, reduce the amount of resources necessary for software development, and enable faster computing speeds. One of the technical challenges with decentralized networks and software development in such networks is the increased number of entry points for malicious parties (e.g., a hacker) to try to exploit. It becomes increasingly more difficult to identify potentially vulnerable entry points as the network scales up. Conventional detection systems rely on assessment of each server. However, this may lead to an inefficient deployment of resources because server assessments are agnostic to actual intrusion counts on each application that the server hosts. Additionally, the decentralized nature of modern networks means that server assessments often must be performed by a variety of different parties. These assessments do not share the same baseline, decreasing the accuracy of vulnerability detection that relies on these various assessments.

SUMMARY OF THE DISCLOSURE

According to one embodiment, a system includes two servers and a vulnerability assessment tool. The first server hosts a copy of a first application and a first copy of a second application. The second server hosts a second copy of the second application and a copy of a third application.

The vulnerability assessment tool includes a memory and a hardware processor. The memory stores data on the number of application intrusions detected on the first, second, and third applications. Application intrusions include things such as account takeover attempts detected for user accounts of the applications. The memory also stores data on the number of vulnerabilities identified in the first application, the first copy of the second application, the second copy of the second application, and the third application. The memory further stores data on the number of vulnerabilities identified on the first and second servers.

The hardware processor is generally configured to analyze data stored in the memory. For example, the hardware processor can provide an indication of which vulnerabilities are being exploited by bad actors. To do so, the hardware processor is configured to calculate a first ratio between the number of application intrusions detected on the first application and the total number of vulnerabilities identified in the copy of the first application and on the first server. The hardware processor is further configured to calculate a second ratio between the number of application intrusions detected on the second application and the total number of vulnerabilities identified in the first copy of the second application and on the first server. The hardware processor is also configured to calculate a third ratio between the number of application intrusions detected on the second application and the total number of vulnerabilities identified in the second copy of the second application and on the second server. The hardware processor is further configured to calculate a fourth ratio between the number of application intrusions detected on the third application and the total number of vulnerabilities detected on the copy of the third application and on the second server. The hardware processor is configured to compare the first, the second, the third, and the fourth calculated ratios and determine that one of them exceeds the others. The hardware processor is further configured to flag for security improvements the application copy that is associated with the ratio that exceeds the others.

The system described in the present application provides a technical solution to the problems discussed above by identifying the security vulnerabilities that are the most likely avenues of attack by malicious parties. For example, the system is able to determine whether the vulnerabilities identified on an application are likely to be exploited based on the number of intrusion events on the application. Additionally, the system is able to analyze the vulnerability of a copy of an application hosted on a server based on the overlapping vulnerabilities identified in the application and on the server. The system is also able to incorporate multi-format vulnerability assessments into its analysis of the true vulnerability of an application or server. This improves the operation and security of the network. Furthermore, it enables efficient allocation of computing resources that are needed to remedy security weaknesses in the application and server software. Thus, the system provides an unconventional technical solution that allows the system to protect itself and the network from attacks by malicious devices.

Certain embodiments of the present disclosure may include some, all, or none of these advantages. These advantages and other features will be more clearly understood from the following detailed description taken in conjunction with the accompanying drawings and claims

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Embodiments of the present disclosure and its advantages are best understood by referring to FIGS. 1-5 of the drawings, like numerals being used for like and corresponding parts of the various drawings.

Figure 1:
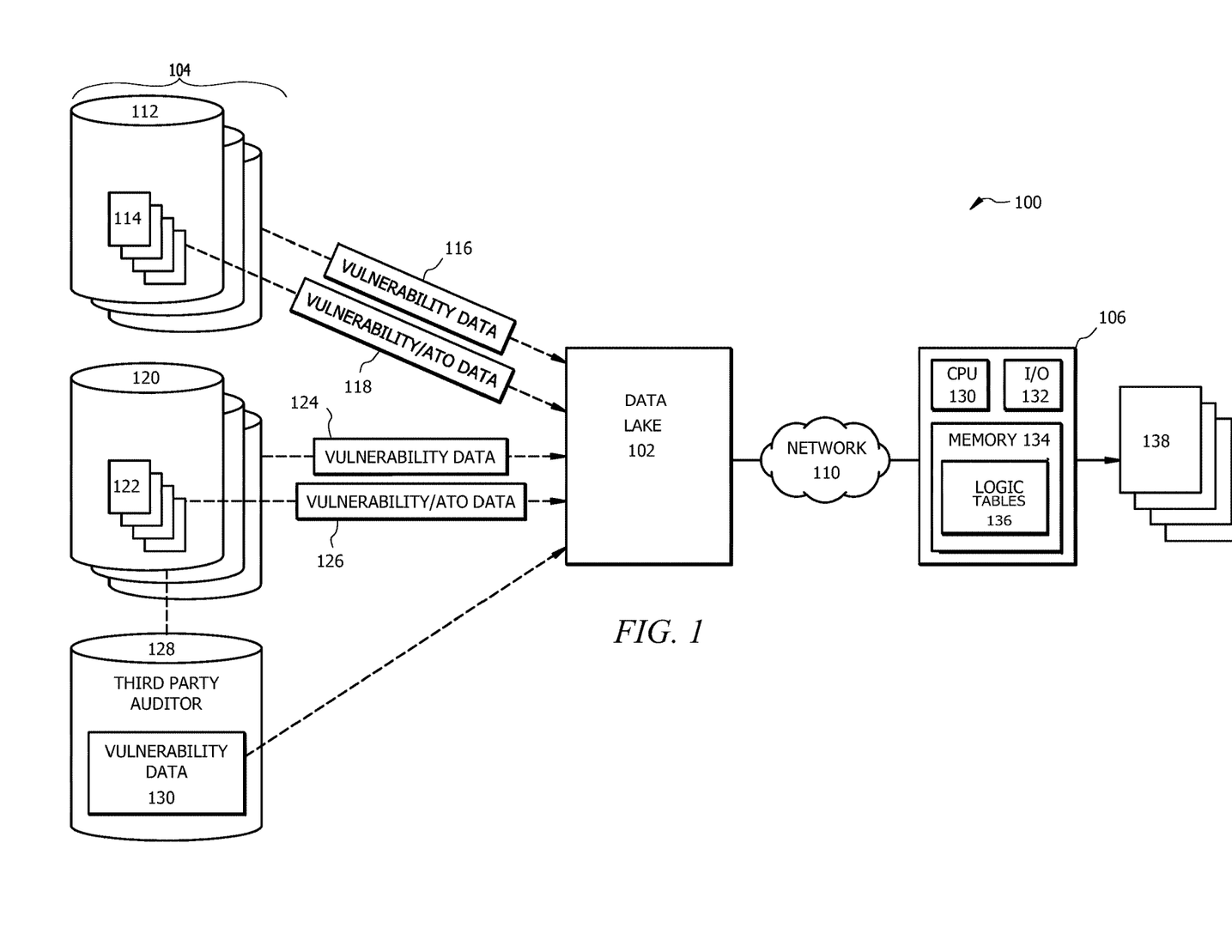
FIG. 1 is a schematic diagram of an embodiment of a network vulnerability assessment system.

FIG. 1 is a schematic diagram of an embodiment of a network vulnerability assessment system 100. System 100 is generally configured to implement network security diagnostics. For example, the system 100 is configured to determine whether the vulnerabilities identified on an application are likely to be exploited based on the number of intrusion events on the application. Similarly, the system 100 is configured to determine whether vulnerabilities identified on a server are likely to be exploited based on the number of intrusion events on applications hosted on the server. Examples of intrusion events include account takeover attempts. The system 100 is further configured to analyze the vulnerability of a copy of an application hosted on a server based on the overlapping vulnerabilities identified in the application and on the server. In other examples, the system 100 incorporates multi-format vulnerability assessments into its analysis of the true vulnerability of an application or server.

System 100 comprises a data lake 102, a plurality of servers 104, and a vulnerability assessment tool 106. The vulnerability assessment tool 106 is generally configured to analyze data stored in data lake 102 and generate one or more reports 138. Data lake 102 stores information from the plurality of servers 104. The components of system 100 are in signal communication via communications network 110. The communications network 110 represents communication equipment, including hardware and any appropriate controlling logic, for interconnecting elements and facilitating communication between interconnected elements. The communications network 110 may include local area networks (LANs), metropolitan area networks (MANs), wide area networks (WANs), any other public or private network, local, regional, or global communication network such as the Internet, enterprise intranet, other suitable wired or wireless communication link, or any combination thereof. The communications network 110 may include any combination of gateways, routers, hubs, switches, access points, base stations, and any other hardware, software, or a combination of the preceding that may implement any suitable protocol. The communications network 110 may include other types of networks, including wireless or wired networks. The communications network 110 is configured to interconnect the data lake 102, servers 104, and vulnerability assessment tool 106. While only one communications network 110 has been illustrated, it should be understood that other embodiments may operate using multiple communications networks 110. In addition, other embodiments may employ one or more wired and wireless networks in communications networks 110.

Servers 104

The servers 104 may comprise a plurality of internal servers 112 and a plurality of external servers 120. The internal servers 112 are servers maintained by the same organization that uses the vulnerability assessment tool 106. The external servers 120 are servers maintained by a third party. Use of the term "internal" does not necessarily mean that the servers 112 are located in the same physical location. The internal servers 112 may be distributed in various places although maintained by the same organization. The internal servers 112 and external servers 120 may be a software as a service (SaaS) server, a web server, a file hosting server, or any other suitable type of network device.

The internal servers 112 each host one or more applications 114 and the external servers 120 each host one or more applications 122. Some of the applications 114 may be identical to copies of applications 122, just located on a different type of server 104. Applications 114 and 122 may be any type of software application. The applications 114 and 122 may require users to log into an account to access portions of the applications 114 and 122. Accounts may have access to multiple applications 114 and 122, or each application 114 and 122 may require separate accounts. The applications 114 and 122 may be for use on any device that is capable of accessing communications network 110. For example, the applications 114 and 122 may be designed for use on a personal computer or a mobile phone. Some of the applications 114 and 122 may have been created by the user of vulnerability assessment tool 106, while other application 114 and 122 may have been created by a third party. Some of the applications 114 and 122 may be supported by the user of vulnerability assessment tool 106. Alternatively, some of the applications 114 and 122 may be supported by a third party. Each application 114 and 122 may be identified by a unique application identifier.

Figure 2A:
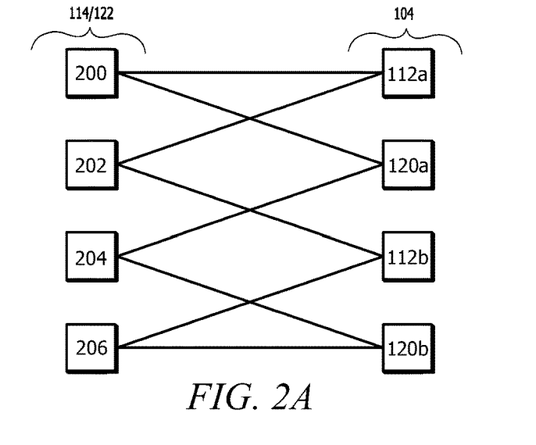
FIG. 2A is a schematic diagram of a portion of an example network.

FIG. 2A illustrates an example network of servers 104 and applications 114/122. In this example, the servers 104 comprise internal servers 112a and 112b and external servers 120a and 120b. The internal server 112a may host a first copy of an application 200 and a first copy of an application 202. The external server 120a may host a second copy of the application 200 and a first copy of an application 204. The internal server 112b may host a second copy of the application 202 and a first copy of an application 206. The external server 120b may host a second copy of the application 204 and a second copy of the application 206.

Data Lake 102

Vulnerability data 116 of the internal servers 112, vulnerability and account takeover (ATO) data 118 for the applications 114, vulnerability data 124 of the external servers 120, vulnerability and account takeover (ATO) data 126 for the applications 122, and vulnerability data 130 received from third-party auditors are collected and stored in data lake 102. The data lake 102 is a data repository. For example, the data lake 102 may be a Hadoop server, SQL Server, SlashDB, or any similar data storage system.

Vulnerability data 116, 124, and 130 are counts of open vulnerabilities on the servers 104. Vulnerability data 116 may be generated in two primary ways. First, vulnerability data 116 may be collected via an automated scan of the servers 112. Automated scans can detect, among other things, missing patches in the operating system of each server 112. Automated scans can also detect exploits in the operating system of each server 112. Vulnerability data 116 may also be collected manually. For example, ethical hackers may identify vulnerabilities in the servers 112. The vulnerability data 116 may include a unique identifier for each open vulnerability. The vulnerability data 116 may further comprise a date when the vulnerability was identified. Vulnerability data 116 may further include a due date for when the vulnerability should be remedied. The vulnerability data 116 may further include an indication of whether it was detected manually or automatically. In some embodiments, the vulnerability data 116 includes a description of the vulnerability.

Vulnerability and account takeover (ATO) data 118 is collected from the applications 114 and stored in data lake 102. The ATO data comprises a count of the intrusion events detected on application 114. An intrusion event is when someone gains unauthorized access to a user account. Intrusion events commonly occur due to credential stuffing and brute force attacks. The vulnerability data for applications 114 may be collected in the same ways as the vulnerability data 116 is collected for the servers 112. Automated scans can detect, among other things, missing patches in the application 114. The vulnerability data for applications 114 may also be collected manually. For example, ethical hackers may identify exploits in the code for application 114. The vulnerability data may include a unique identifier of which copy of application 114 contains the vulnerability. Additionally, there may be a unique identifier associated with vulnerability. The vulnerability data may comprise a date when the vulnerability was identified. The vulnerability data may further include a due date for when the vulnerability should be remedied. The vulnerability data may further include an indication of whether it was detected manually or automatically. In some embodiments, the vulnerability data includes a description of the vulnerability.

Vulnerability data 124 are the same type of data as vulnerability data 116, but they relate to the external servers 120 instead of the internal servers 112. Likewise, the vulnerability and ATO data 126 are of the same type as vulnerability and ATO data 118, but they relate to the applications 122 instead of the applications 114. The vulnerability data 130 are similar to the vulnerability data 124. The difference between vulnerability data 130 and vulnerability data 124 is that vulnerability data 130 is collected by third party auditors who analyze the external servers 120.

Figure 2B:
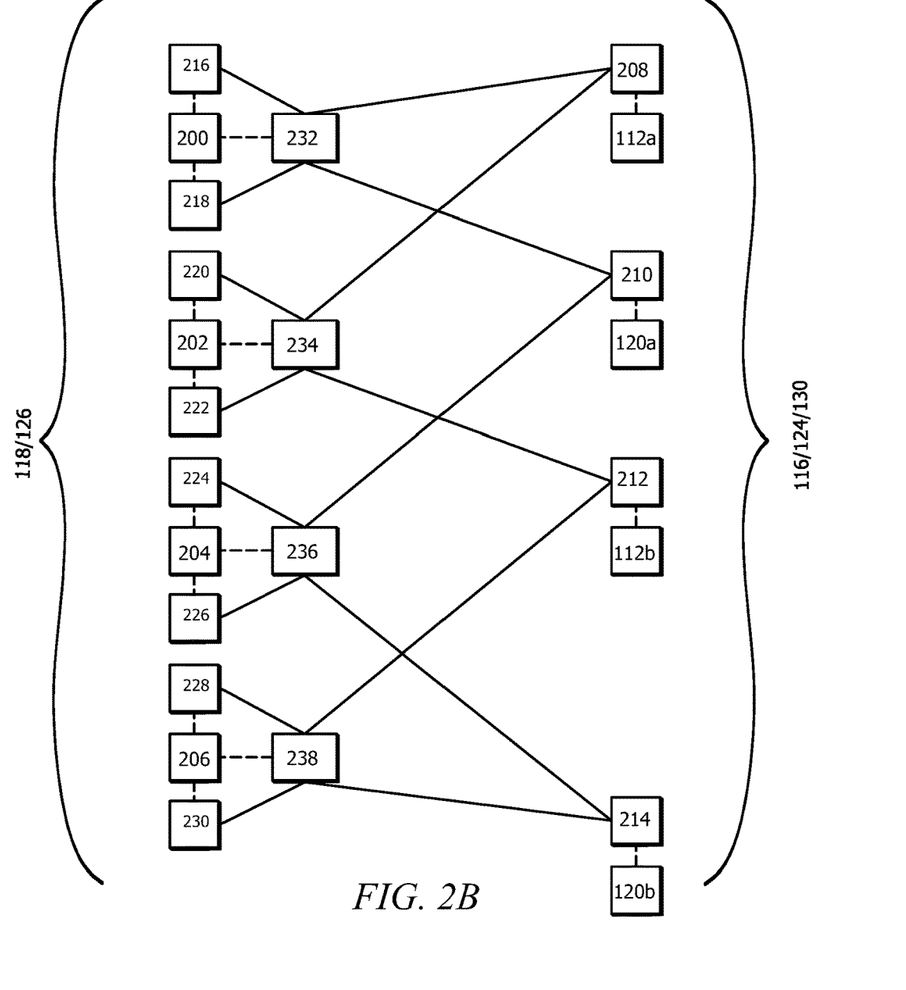
FIG. 2B is a schematic illustrating the types of data collected from the network of FIG. 2A.
Figure 3:
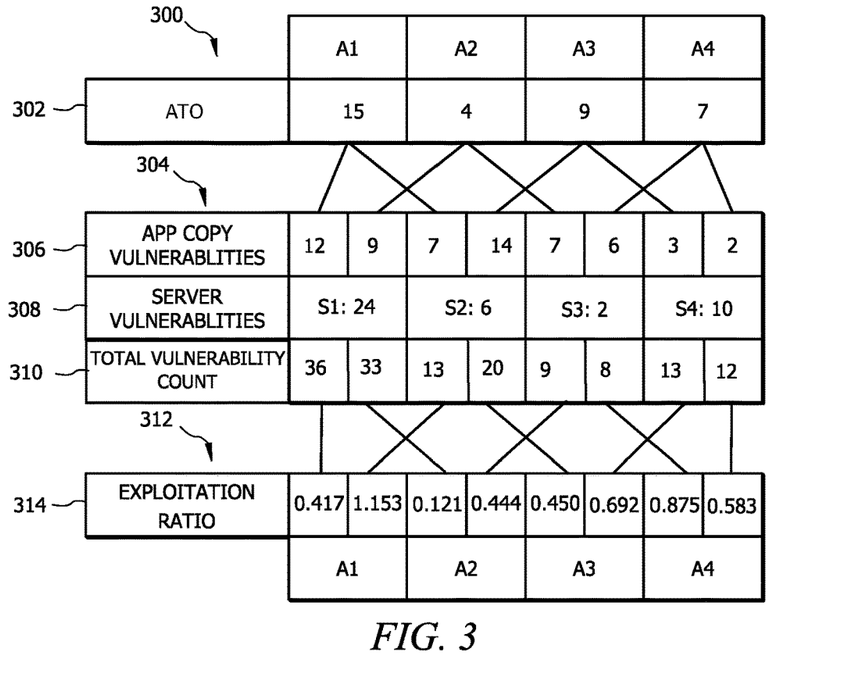
FIG. 3 is a schematic of a logic table generated by an embodiment of a network vulnerability assessment tool.

FIG. 2B illustrates the types of data collected in data lake 102. In this example, internal server 112a has a set of vulnerabilities 208, external server 120a has a set of vulnerabilities 210, internal server 112b has a set of vulnerabilities 212, and external server 120b has a set of vulnerabilities 214. Regardless of their source, each of these vulnerability counts are congregated in the data lake 102. On the application side, the data lake 102 contains vulnerability and ATO data for each application. In the example of FIG. 2B, application 200 has a set of vulnerabilities 216 that are found on the copy of application 200 residing on internal server 112a. Application 200 also has a set of vulnerabilities 218 that are found on the copy of application 200 residing on external server 120a. Application 202 has a set of vulnerabilities 220 that are found on the copy of application 202 residing on internal server 112a. Application 202 also has a set of vulnerabilities 222 that are found on the copy of application 202 residing on internal server 112b. Application 204 has a set of vulnerabilities 224 that are found on the copy of application 204 residing on external server 120a. Application 204 also has a set of vulnerabilities 226 that are found on the copy of application 204 residing on external server 120b. Application 206 has a set of vulnerabilities 228 that are found on the copy of application 206 residing on internal server 112b. Application 206 also has a set of vulnerabilities 230 that are found on the copy of application 206 residing on external server 120b. Application 200 has an intrusion count (ATO) 232, application 202 has an intrusion count 234, application 204 has an intrusion count 236, and application 206 has an intrusion count 238. As illustrated in FIG. 3, intrusion (ATO) counts are for the application overall rather than for specific copies of the application. The lines connecting the vulnerabilities to the ATO counts illustrate potential relationships that are explored by vulnerability assessment tool 106.

Vulnerability Assessment Tool 106

The vulnerability assessment tool 106 is generally configured to analyze the data stored in data lake 102 and generate one or more reports 138. Vulnerability assessment tool 106 comprises a processor 130, a network interface 132, and a memory 134. The processor 130 comprises one or more processors operably coupled to the memory 134. The processor 130 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 130 may be a programmable logic device, a microcontroller, a microprocessor, or any suitable combination of the preceding. The one or more processors are configured to process data and may be implemented in hardware or software. For example, the processor 130 may be 8-bit, 16-bit, 32-bit, 64-bit or of any other suitable architecture. The processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors 130 are configured to implement various instructions. For example, the one or more processors 130 are configured to execute instructions to construct logic tables 136. In this way, processor 130 may be a special purpose computer designed to implement the functions disclosed herein.

The network interface 132 is configured to enable wired and/or wireless communications. The network interface 132 is configured to communicate data between the vulnerability assessment tool 106 and other devices, systems, or domains (e.g., data lake 102). For example, the network interface 132 may comprise a WIFI interface, a LAN interface, a WAN interface, a modem, a switch, or a router. The processor 130 is configured to send and receive data using the network interface 132. The network interface 132 may be configured to use any suitable type of communication protocol as would be appreciated by one of ordinary skill in the art.

Memory 134 comprises one or more disks, tape drives, or solid-state drives, and may be used as an over-flow data storage device, to store programs when such programs are selected for execution, and to store instructions and data that are read during program execution. The memory 134 may be volatile or non-volatile and may comprise read-only memory (ROM), random-access memory (RAM), ternary content-addressable memory (TCAM), dynamic random-access memory (DRAM), and static random-access memory (SRAM). The memory 134 is operable to store logic tables 136. The logic tables 136 are generated by processor 130. Additional detail regarding logic tables 136 is provided below in the discussion of FIGS. 3-5.

Data Analysis/Report Generation

Figure 4:
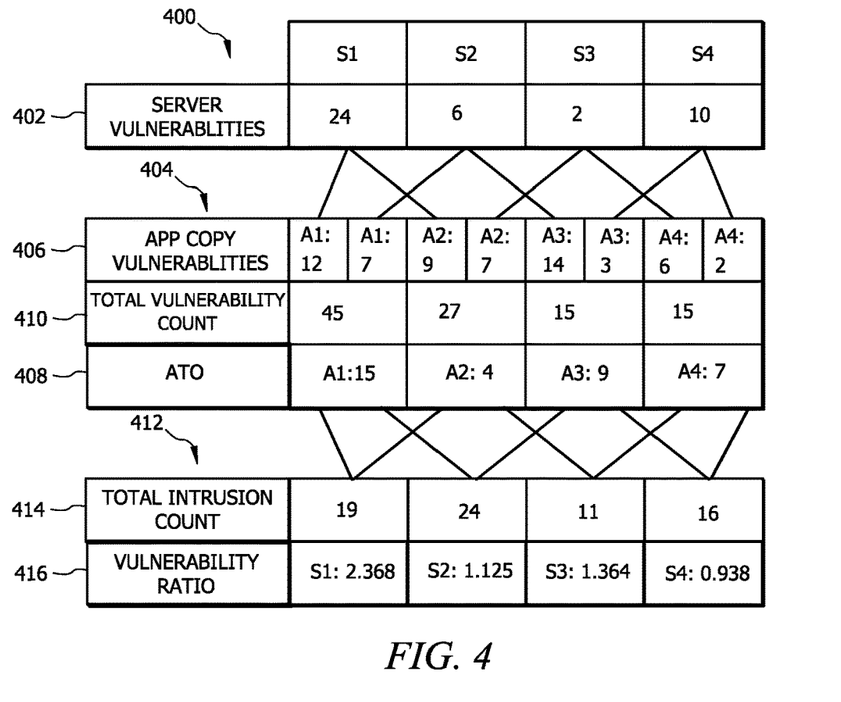
FIG. 4 is a schematic of a logic table generated by an alternate embodiment of a network vulnerability assessment tool.

FIGS. 3 and 4 are schematics of logic tables 136 generated by an embodiment of the vulnerability assessment tool 106. Processor 130 uses artificial intelligence and machine learning to generate logical connections between the unordered data stored in data lake 102. For example, the vulnerability assessment tool 106 may be configured to determine the rate at which ATO occurs in comparison to the number of open vulnerabilities on an application, as illustrated in FIG. 3, or it may be configured to determine which servers are more vulnerable based on the ratio between the number of vulnerabilities affecting a server and the number of ATO events on applications hosted on that server, as illustrated in FIG. 4.

In FIG. 3, table 300 shows the number of ATO events 302 that were detected for four applications. In this example, there were 15 ATO events (i.e., application intrusions) on application A1, 4 ATO events on application A2, 9 ATO events on application A3, and 7 ATO events on application A4. These numbers are a specific example of application intrusion counts. Vulnerability assessment tool 106 then compares this data to the total number of open vulnerabilities that affect that application.

Table 304 diagrams the vulnerability counts and links them to the application intrusion counts of table 300. The application vulnerability counts 306 comprise the vulnerability data 118 and vulnerability data 126 stored in data lake 102. The server vulnerability counts 308 comprise the vulnerability data 116, vulnerability data 124, and vulnerability data 130 stored in data lake 102. Each copy of an application has an associated application vulnerability count 306. The vulnerability assessment tool 106 calculates a total vulnerability count 310 for each application, which is the sum of the application vulnerability count 306 for a copy of the application and the server vulnerability count 308 for the server on which the copy of the application resides. For example, the total vulnerability count 310 affecting the copy of application A1 that is hosted on server S1 is the sum of that copy's open vulnerabilities (12) and the server's open vulnerabilities (24). The total vulnerability count 310 affecting the copy of A1 that is hosted on server S2 is the sum of the copy's open vulnerabilities (7) and the server's open vulnerabilities (6). The total vulnerability count 310 affecting the copy of A2 that is hosted on server S1 is the sum of the copy's open vulnerabilities (9) and the server's open vulnerabilities (24). The total vulnerability count 310 affecting the copy of A2 that is hosted on server S3 is the sum of the copy's open vulnerabilities (7) and the server's open vulnerabilities (2). The total vulnerability count 310 affecting the copy of A3 that is hosted on server S2 is the sum of the copy's open vulnerabilities (14) and the server's open vulnerabilities (6). The total vulnerability count 310 affecting the copy of A3 that is hosted on server S4 is the sum of the copy's open vulnerabilities (3) and the server's open vulnerabilities (10). The total vulnerability count 310 affecting the copy of A4 that is hosted on server S3 is the sum of the copy's open vulnerabilities (6) and the server's open vulnerabilities (2). The total vulnerability count 310 affecting the copy of A4 that is hosted on server S4 is the sum of the copy's open vulnerabilities (2) and the server's open vulnerabilities (10).

The processor 130 then determines an exploitation ratio 314 for each copy of each application, which is the ratio between the ATO events 302 detected on an application and the total vulnerability count 310 affecting the copy of the application. The exploitation ratio 314 provides an indication of which vulnerabilities are most susceptible to being exploited. Table 312 illustrates exploitation ratios 314 in the example of FIG. 3. For the copy of application A1 that is hosted on server S1, this value is 15/36. For the copy of application A1 that is hosted on server S2, this value is 15/13. For the copy of application A2 that is hosted on server S1, this value is 4/33. For the copy of application A2 that is hosted on server S3, this value is 4/9. For the copy of application A3 that is hosted on server S2, this value is 9/20. For the copy of application A3 that is hosted on server S4, this value is 9/13. For the copy of application A4 that is hosted on server S3, this value is 7/8. For the copy of application A4 that is hosted on server S4, this value is 7/12. Each of these ratios is presented in decimal form in FIG. 3.

FIG. 4 illustrates a similar analysis by which vulnerability assessment tool 106 may calculate a vulnerability ratio 416, which is the ratio between the number of vulnerabilities (server vulnerabilities+application copy vulnerabilities) and the number of ATO events 408 on applications hosted on that server. A vulnerability ratio 416 that is lower than that of the other servers indicates that server is more susceptible to exploitation. A higher vulnerability ratio 416 than that of the other servers indicates that many of the identified vulnerabilities are not being exploited or are unfavorable targets.

Table 400 shows the number of server vulnerabilities 402 that were identified on four servers: S1, S2, S3, and S4. In this example, server S1 has 24 open vulnerabilities, server S2 has 6 open vulnerabilities, server S3 has 2 open vulnerabilities, and server S4 has 10 open vulnerabilities. The table 400 is linked to a table 404 that details the application copy vulnerabilities 406 and ATO counts 408 for different applications. Server S1 hosts copies of application A1 and A2, server S2 hosts copies of applications A1 and A3, server S3 hosts copies of applications A2 and A4, and server S4 hosts copies of applications A3 and A4.

The processor 130 determines a total vulnerability count 410 for each server based on the sum of the server's vulnerabilities 402 and the vulnerabilities 406 of the application copies hosted on the server. In this example, the total vulnerability count 410 for server S1 is the sum of the server's vulnerabilities (24), the vulnerabilities of application A1 hosted on S1 (12), and the vulnerabilities of application A2 hosted on S1 (9). The total vulnerability count 410 for server S2 is the sum of the server's vulnerabilities (6), the vulnerabilities of application A1 hosted on S2 (7), and the vulnerabilities of application A3 hosted on S2 (14). The total vulnerability count 410 for server S3 is the sum of the server's vulnerabilities (2), the vulnerabilities of application A2 hosted on S3 (7), and the vulnerabilities of application A4 hosted on S3 (6). The total vulnerability count 410 for server S4 is the sum of the server's vulnerabilities (10), the vulnerabilities of application A3 hosted on S4 (3), and the vulnerabilities of application A4 hosted on S4 (2). Thus, the total vulnerability counts 410 are 45 for S1, 27 for S2, 15 for S3, and 15 for S4.

The table 404 is linked to a table 412 that includes a total intrusion count 414 and a vulnerability ratio 416. The processor 136 determines a total intrusion count 414 for each server based on the sum of the individual intrusion counts (e.g., ATO events) 408 for each type of application hosted on the server. For example, the total intrusion count 414 for server S1 is the sum of the ATO count 408 for application A1 (15) and application A2 (4). Thus, the total intrusion counts 414 are 19 for server S1, 24 for server S2, 11 for server S3, and 16 for server S4. The processor 136 may then determine a vulnerability ratio 416, which is the ratio between the total vulnerability count 414 and the total intrusion count 414. The vulnerability ratios 416 in FIG. 4 are 45/19 for server S1, 27/24 for server S2, 15/11 for server S3, and 15/16 for server S4. Each of these ratios is presented in decimal form in FIG. 4.

Figure 5:
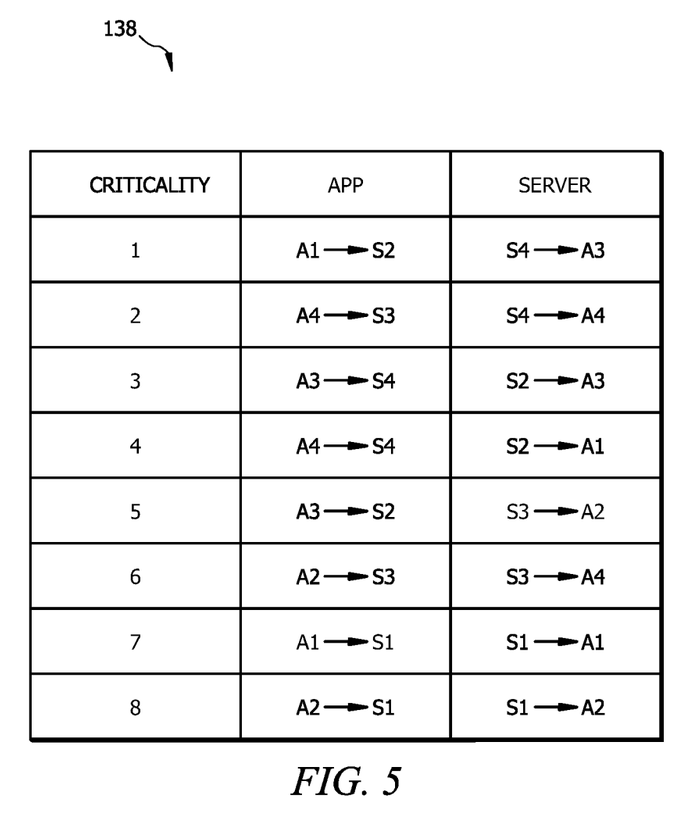
FIG. 5 is a schematic of a network vulnerability assessment report.

The vulnerability assessment tool 106 may use the exploitation ratios 314 and vulnerability ratios 416 calculated in FIGS. 3 and 4 to generate one or more reports 138 as illustrated in FIG. 5. The reports 138 provide a visual reference of how critical the identified vulnerabilities are to the system. Because the copy of application A1 hosted on Server S2 had the highest exploitation ratio 314 in table 312 of FIG. 3, it is listed as the most critical in FIG. 5. The other application copies are listed in decreasing order based on the size of their exploitation ratio 314 calculated in table 312 of FIG. 3. FIG. 5 provides a similar visualization of the results from table 412 of FIG. 4. In the case of server vulnerability ratios 416, the server with the lowest ratio is considered more critical. The vulnerability assessment tool 106 may flag one or more of the applications or one or more of the servers for repair based on the criticality of the application or server. The reports 138 may be in text form. Alternatively, the reports 138 may be data files capable of importation into a data visualization platform such as Tableau, Arcadia, Cognos Analytics, or other similar programs.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A vulnerability assessment system, comprising:
    a first server hosting:
        a copy of a first application; and
        a first copy of a second application;
    a second server hosting:
        a second copy of the second application; and
        a copy of a third application;
    a vulnerability assessment tool comprising:
        a memory configured to store:
            a first application intrusion count, comprising the number of application intrusions detected on the first application;
            a second application intrusion count, comprising the number of application intrusions detected on the second application;
            a third application intrusion count, comprising the number of application intrusions detected on the third application;
            a first application vulnerability count, comprising the number of vulnerabilities identified in the copy of the first application hosted on the first server;
            a second application vulnerability count, comprising the number of vulnerabilities identified in the first copy of the second application;
            a third application vulnerability count, comprising the number of vulnerabilities identified in the second copy of the second application;
            a fourth application vulnerability count, comprising the number of vulnerabilities identified in the copy of the third application hosted on the second server;
            a first server vulnerability count, comprising a number of vulnerabilities identified on the first server;
            a second server vulnerability count, comprising the number of vulnerabilities identified on the second server;
        a hardware processor configured to:
            determine a first exploitation ratio, comprising a ratio between the first application intrusion count and a first total vulnerability count, the first total vulnerability count comprising the sum of the first application vulnerability count and the first server vulnerability count;
            determine a second exploitation ratio, comprising a ratio between the second application intrusion count and a second total vulnerability count, the second total vulnerability count comprising the sum of the second application vulnerability count and the first server vulnerability count;
            determine a third exploitation ratio, comprising a ratio between the second application intrusion count and a third total vulnerability count, the third total vulnerability count comprising the sum of the third application vulnerability count and the second server vulnerability count;
            determine a fourth exploitation ratio, comprising the ratio between the third application intrusion count and a fourth total vulnerability count, the fourth total vulnerability count comprising the fourth application vulnerability count and the second server vulnerability count;
            determine that one of the first exploitation ratio, the second exploitation ratio, the third exploitation ratio, or the fourth exploitation ratio exceeds the others;
            flag for security improvements the copy of the first, second, or third application associated with the exploitation ratio exceeding the other exploitation ratios.

2. The vulnerability assessment system of claim 1, the hardware processor further configured to:
    identify which server hosts the flagged copy of the first, second, or third application associated with the exploitation ratio exceeding the other exploitation ratios; and
    flag the identified server for security improvements.

3. The vulnerability assessment system of claim 1, wherein the first server vulnerability count comprises data received from a third-party auditor.

4. The vulnerability assessment system of claim 1, wherein vulnerabilities identified in the copy of the first application hosted on the first server comprise manually detected vulnerabilities.

5. The vulnerability assessment system of claim 1, the hardware processor further configured to:
    determine a fifth total vulnerability count, comprising the sum of the first application vulnerability count, the second application vulnerability count, and the first server vulnerability count;
    determine a sixth total vulnerability count, comprising the sum of the third application vulnerability count, the fourth application vulnerability count, and the second server vulnerability count;
    determine a first total intrusion count, comprising the sum of the first application intrusion count and the second application intrusion count;
    determine a second total intrusion count, comprising the sum of the second application intrusion count and the third application intrusion count;

determine a first vulnerability ratio, associated with the first server, comprising a ratio between the fifth total vulnerability count and the first total intrusion count;

determine a second vulnerability ratio, associated with the second server, comprising the ratio between the sixth total vulnerability count and the second total intrusion count;

flag the server associated with the lower vulnerability ratio for security improvements.

6. The vulnerability assessment system of claim 5, the hardware processor further configured to:

identify, from among the copies of the first, second, or third application hosted on the server flagged for security improvements, the copy that has the highest application vulnerability count;

flag the identified copy of the first or second application for security improvements.

7. The vulnerability assessment system of claim 5, wherein the first server vulnerability count comprises data received from a third-party auditor.

8. A vulnerability assessment method, comprising:

determining a first exploitation ratio, comprising a ratio between a first application intrusion count and a first total vulnerability count, wherein the first total vulnerability count comprises the sum of a first application vulnerability count and a first server vulnerability count, and wherein:

the first application intrusion count comprises the number of application intrusions detected on a first application;

the first application vulnerability count comprises the number of vulnerabilities identified in the copy of the first application hosted on the first server; and the first server vulnerability count comprises a number of vulnerabilities identified on the first server;

determining a second exploitation ratio, comprising a ratio between a second application intrusion count and a second total vulnerability count, wherein the second total vulnerability count comprises the sum of a second application vulnerability count and the first server vulnerability count, and wherein:

the second application intrusion count comprises the number of application intrusions detected on a second application;

the second application vulnerability count comprises the number of vulnerabilities identified in a first copy of the second application hosted on the first server; and determining a third exploitation ratio, comprising a ratio between the second application intrusion count and a third total vulnerability count, the third total vulnerability count comprising the sum of a third application vulnerability count and a second server vulnerability count, and wherein;

the third application vulnerability count comprises the number of vulnerabilities identified in a second copy of the second application hosted on the second server;

the second server vulnerability count comprises the number of vulnerabilities identified on the second server;

determining a fourth exploitation ratio, comprising the ratio between a third application intrusion count and a fourth total vulnerability count, the fourth total vulnerability count comprising a fourth application vulnerability count and the second server vulnerability count, and wherein:

the third application intrusion count comprises the number of application intrusions detected on the third application;

the fourth application vulnerability count comprises the number of vulnerabilities identified in the copy of the third application hosted on the second server;

determining that one of the first exploitation ratio, the second exploitation ratio, the third exploitation ratio, or the fourth exploitation ratio exceeds the others;

flagging for security improvements the copy of the first, second, or third application associated with the exploitation ratio exceeding the other exploitation ratios.

9. The vulnerability assessment method of claim 8, further comprising:

identifying which server hosts the flagged copy of the first, second, or third application associated with the exploitation ratio exceeding the other exploitation ratios; and flagging the identified server for security improvements.

10. The vulnerability assessment method of claim 8, wherein the first server vulnerability count comprises data received from a third-party auditor.

11. The vulnerability assessment method of claim 8, wherein vulnerabilities identified in the copy of the first application hosted on the first server comprise manually detected vulnerabilities.

12. The vulnerability assessment method of claim 8, further comprising:

determining a fifth total vulnerability count, comprising the sum of the first application vulnerability count, the second application vulnerability count, and the first server vulnerability count;

determining a sixth total vulnerability count, comprising the sum of the third application vulnerability count, the fourth application vulnerability count, and the second server vulnerability count;

determining a first total intrusion count, comprising the sum of the first application intrusion count and the second application intrusion count;

determining a second total intrusion count, comprising the sum of the second application intrusion count and the third application intrusion count;

determining a first vulnerability ratio, associated with the first server, comprising a ratio between the fifth total vulnerability count and the first total intrusion count;

determining a second vulnerability ratio, associated with the second server, comprising the ratio between the sixth total vulnerability count and the second total intrusion count;

flagging the server associated with the lower vulnerability ratio for security improvements.

13. The vulnerability assessment method of claim 12, further comprising:

identifying, from among the copies of the first, second, or third application hosted on the server flagged for security improvements, the copy that has the highest application vulnerability count;

flagging the identified copy of the first or second application for security improvements.

14. A vulnerability assessment device, comprising:

a memory configured to store:

a first application intrusion count, comprising the number of application intrusions detected on a first application;

a second application intrusion count, comprising the number of application intrusions detected on a second application;

a third application intrusion count, comprising the number of application intrusions detected a third application;

a first application vulnerability count, comprising the number of vulnerabilities identified in a copy of the first application hosted on a first server;

a second application vulnerability count, comprising the number of vulnerabilities identified in a first copy of the second application hosted on the first server;

a third application vulnerability count, comprising the number of vulnerabilities identified in a second copy of the second application hosted on a second server;

a fourth application vulnerability count, comprising the number of vulnerabilities identified in a copy of the third application hosted on the second server;

a first server vulnerability count, comprising a number of vulnerabilities identified on the first server;

a second server vulnerability count, comprising the number of vulnerabilities identified on the second server;

a hardware processor configured to:

determine a first exploitation ratio, comprising a ratio between the first application intrusion count and a first total vulnerability count, the first total vulnerability count comprising the sum of the first application vulnerability count and the first server vulnerability count;

determine a second exploitation ratio, comprising a ratio between the second application intrusion count and a second total vulnerability count, the second total vulnerability count comprising the sum of the second application vulnerability count and the first server vulnerability count;

determine a third exploitation ratio, comprising a ratio between the second application intrusion count and a third total vulnerability count, the third total vulnerability count comprising the sum of the third application vulnerability count and the second server vulnerability count;

determine a fourth exploitation ratio, comprising the ratio between the third application intrusion count and a fourth total vulnerability count, the fourth total vulnerability count comprising the fourth application vulnerability count and the second server vulnerability count;

determine that one of the first exploitation ratio, the second exploitation ratio, the third exploitation ratio, or the fourth exploitation ratio exceeds the others;

flag for security improvements the copy of the first, second, or third application associated with the exploitation ratio exceeding the other exploitation ratios.

15. The vulnerability assessment device of claim 14, the hardware processor further configured to:
identify which server hosts the flagged copy of the first, second, or third application associated with the exploitation ratio exceeding the other exploitation ratios; and
flag the identified server for security improvements.

16. The vulnerability assessment device of claim 14, wherein the first server vulnerability count comprises data received from a third-party auditor.

17. The vulnerability assessment device of claim 14, wherein vulnerabilities identified in the copy of the first application hosted on the first server comprise manually detected vulnerabilities.

18. The vulnerability assessment device of claim 14, the hardware processor further configured to:
determine a fifth total vulnerability count, comprising the sum of the first application vulnerability count, the second application vulnerability count, and the first server vulnerability count;
determine a sixth total vulnerability count, comprising the sum of the third application vulnerability count, the fourth application vulnerability count, and the second server vulnerability count;
determine a first total intrusion count, comprising the sum of the first application intrusion count and the second application intrusion count;
determine a second total intrusion count, comprising the sum of the second application intrusion count and the third application intrusion count;
determine a first vulnerability ratio, associated with the first server, comprising a ratio between the fifth total vulnerability count and the first total intrusion count;
determine a second vulnerability ratio, associated with the second server, comprising the ratio between the sixth total vulnerability count and the second total intrusion count;
flag the server associated with the lower vulnerability ratio for security improvements.

19. The vulnerability assessment device of claim 18, the hardware processor further configured to:
identify, from among the copies of the first, second, or third application hosted on the server flagged for security improvements, the copy that has the highest application vulnerability count;
flag the identified copy of the first or second application for security improvements.

20. The vulnerability assessment device of claim 18, wherein the first server vulnerability count comprises data received from a third-party auditor.

* * * * *